(12) United States Patent
Prasad et al.

(10) Patent No.: US 6,716,278 B2
(45) Date of Patent: Apr. 6, 2004

(54) COMPOSITIONS AND METHODS FOR SELECTING INK-JET INKS EXHIBITING REDUCED PUDDLING

(75) Inventors: Keshava A. Prasad, San Marcos, CA (US); John M. Gardner, San Diego, CA (US); Peter C. Morris, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 94 days.

(21) Appl. No.: 10/059,689

(22) Filed: Jan. 28, 2002

(65) Prior Publication Data

US 2003/0150356 A1 Aug. 14, 2003

(51) Int. Cl.$^7$ .......................... C09D 11/00; C09D 11/02
(52) U.S. Cl. .................. 106/31.58; 106/31.27; 8/636
(58) Field of Search ................ 106/31.27, 31.58; 8/636

(56) References Cited

U.S. PATENT DOCUMENTS

| | | | |
|---|---|---|---|
| 5,364,461 A | | 11/1994 | Beach et al. |
| 5,725,641 A | * | 3/1998 | MacLeod .................. 106/31.5 |
| 5,814,138 A | | 9/1998 | Fague |
| 5,851,273 A | * | 12/1998 | Morris et al. ............ 106/31.27 |
| 5,858,075 A | * | 1/1999 | Deardurff et al. ........ 106/31.27 |
| 5,981,623 A | * | 11/1999 | McCain et al. ............ 523/160 |
| 6,503,308 B2 | * | 1/2003 | Stramel et al. .......... 106/31.27 |
| 2003/0019395 A1 | * | 1/2003 | Ma et al. ................. 106/31.59 |
| 2003/0061963 A1 | * | 4/2003 | Blease et al. ............ 106/31.27 |
| 2003/0079650 A1 | * | 5/2003 | Prasad et al. ............ 106/31.58 |
| 2003/0101904 A1 | * | 6/2003 | Morris et al. ............ 106/31.48 |

FOREIGN PATENT DOCUMENTS

| | | |
|---|---|---|
| EP | 0 366 121 | 5/1990 |
| EP | 0 867 486 | 9/1998 |

* cited by examiner

Primary Examiner—Helene Klemanski

(57) ABSTRACT

A method of selecting a dye for use with a spreading vehicle can comprise the steps of evaluating a first dye having polar atoms and a second dye having polar atoms to determine a first polarity index and a second polarity index, respectively; and selecting the first dye or the second dye for inclusion in the spreading vehicle based upon a comparison of the first polarity index and the second polarity index. Further, a method of evaluating a dye and formulating an ink-jet ink can comprise the steps of providing a spreading ink-jet ink vehicle; selecting a dye to be evaluated for inclusion in the spreading ink-jet ink vehicle; determining the ratio of polar atoms to carbon atoms within the dye; selecting a desired polarity index ratio range; and admixing the dye with the spreading ink-jet ink vehicle if the ratio is within the desired polarity index ratio range. Additionally, an ink-jet ink composition exhibiting reduced orifice plate puddling can comprise an ink-jet ink vehicle containing 7% to 15% by weight of a 1,2-hexanediol solvent in the absence of added surfactant; and an effective amount of a dye having a normalized polarity index from about 7 to 12.

26 Claims, No Drawings

COMPOSITIONS AND METHODS FOR SELECTING INK-JET INKS EXHIBITING REDUCED PUDDLING

FIELD OF THE INVENTION

The present invention is drawn toward the controlling of orifice plate puddling of ink-jet inks having spreading vehicles. More specifically, the present invention is drawn toward compositions and methods of selecting dyes for use with spreading vehicles, such as 1,2-hexanediol vehicles, without added surfactant.

BACKGROUND OF THE INVENTION

Thermal ink-jet printers provide an effective means of propelling ink-jet inks onto various media including paper. These printers can accomplish this by using resistive heater elements for heating the ink to a boil, and propelling the ink through an overlying orifice plate. Specifically, a typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. Each chamber has a thin-film resistor located opposite the nozzle so ink can collect between the firing resistor and the nozzle. Upon energizing a particular resistor element, a droplet of ink is expelled through the nozzle toward a print medium. Such printers, as typified by the Hewlett-Packard DeskJet™ and DesignJet™ printers, are desirable for use for several reasons. For example, thermal ink-jet printers have a relatively fast throughput while being relatively inexpensive to run. Additionally, these printers are relatively easy to use, and the ink is easily replaced.

There are several other reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, new applications, etc. As new ink-jet inks are developed, there are several traditional characteristics to consider when evaluating the ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long-term storage stability, good dot size and dot gain, color-to-color bleed alleviation, acceptable coalescence, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

In general, ink-jet inks are either dye- or pigment-based inks. Dye-based ink-jet inks generally use a soluble colorant that is usually water-based to turn the media a specific color. Alternatively, pigmented inks typically use a dispersed colorant to achieve color. In many cases, the line quality and accuracy of plots produced by pigment-based inks can be superior to that of dye-based inks. However, certain challenges exist with pigments because the colorant is present as dispersion. With pigmented inks, solid particles are jetted with a vehicle and the solid particles adhere to the surface of the substrate. Once the water in the solution has evaporated, the particles will generally not redisperse, thereby producing a dried image.

As dye-based ink-jet inks have become more accurate as to their printability, increased interest in providing such inks has occurred. However, the problems associated with puddling of these ink-jet inks, particularly on the orifice plate of the ink-jet pen, have been problematic.

SUMMARY OF THE INVENTION

The present invention is drawn to compositions and methods related to ink-jet inks that exhibit reduced puddling at the orifice plate of an ink-jet ink pen. First, a method of selecting a dye for use with a spreading vehicle can comprise the steps of evaluating a first dye having polar atoms and a second dye having polar atoms to determine a first polarity index and a second polarity index, respectively; and selecting the first dye or the second dye for inclusion in the spreading vehicle based upon a comparison of the first polarity index and the second polarity index.

Alternatively, a method of evaluating a dye and formulating an ink-jet ink can comprise the steps of providing a spreading ink-jet ink vehicle; selecting a dye or mixture of dyes to be evalulated for inclusion in the spreading ink-jet ink vehicle; determining the ratio of polar atoms to carbon atoms within the dye; selecting a desired polarity index ratio range; and admixing the dye with the spreading ink-jet ink vehicle if the ratio is within the desired polarity index ratio range.

Additionally, an ink-jet ink composition exhibiting reduced orifice plate puddling can comprise an ink-jet ink vehicle containing 7% to 15% by weight of a 1,2-hexanediol solvent in the absence of added surfactant; and an effective amount of a dye having a normalized polarity index from about 7 to 12, wherein the normalized polarity index is calculated according to the following formula:

$$\frac{(\text{number of polar atoms}) \times 10}{(\text{number of carbon atoms})}$$

and wherein the number of polar atoms is the number of oxygen, nitrogen, sulfur, phosphorus, and halogen atoms (particularly chlorine, bromine, and iodine) within the dye.

DETAILED DESCRIPTION OF THE INVENTION

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "a dye" includes reference to one or more of such dyes.

As used herein, "effective amount" refers to the minimal amount of a substance or agent, which is sufficient to achieve a desired result. For example, an effective amount of an "ink vehicle" is the minimum amount required in order to create an ink composition, while maintaining properties necessary for effective ink jetting.

As used herein, "ink vehicle" or "spreading ink-vehicle" refers to the composition in which the polar dyes are added to provide ink-jet ink compositions. Ink vehicles are well known in the art, and a wide variety of ink vehicles may be used with the methods and ink composition of the present invention. Preferably, 1,2-hexanediol solvent based ink-vehicles provide good spreading and jetting characteristics. Further, the ink-vehicle can be defined by many other known components, but preferably excludes the presence of traditional surfactants.

An "ink-jet ink" or "ink composition" comprises a spreading ink vehicle, a dye, and water.

One important factor in obtaining good photographic image quality on photographic media is to provide ink-jet inks comprising a vehicle that spreads well. Such vehicles can form dots that are less visible (for less grain) and hide printer artifacts like banding. However, these types of highly spreading vehicles also have a propensity to puddle on the orifice plate of the ink-jet print head. This puddling causes misdirected drops in the form of satellite spotting leading to poor image quality.

It has been discovered that polar dyes such as RB31 and DB199, when added to spreading vehicles, such as 1,2-hexanediol vehicles in the absence of added surfactant, reduces or substantially eliminates the extent of puddling on the orifice plate. In the prior art, prior solutions used to prevent this puddling included the use of certain types and levels of surfactants. However, often surfactants lead to poor dot spreading, particularly on photographic type media. With the present invention, highly polar dyes can be used with spreading vehicles, such as 1,2-hexanediol based vehicles in particular, solving many problems of the prior art. First, as mentioned, reduced puddling on the orifice plate can be realized. Because of this reduced puddling, better drop directionality and less banding visible on the printed image is present. Additionally, these inks help maintain good nozzle health due to the maintaining of a cleaner orifice plate. Good nozzle health is one factor that contributes to nozzle reliability.

With this in mind, a method of selecting a dye for use with a spreading vehicle can comprise the steps of evaluating a first dye having polar atoms and a second dye having polar atoms to determine a first polarity index and a second polarity index, respectively; and selecting the first dye or the second dye for inclusion in the spreading vehicle based upon a comparison of the first polarity index and the second polarity index.

Alternatively, a method of evaluating a dye and formulating an ink-jet ink can comprise the steps of providing a spreading ink-jet ink vehicle; selecting a dye to be evaluated for inclusion in the spreading ink-jet ink vehicle; determining the ratio of polar atoms to carbon atoms within the dye; selecting a desired polarity index ratio range for the ratio; and admixing the dye with the spreading ink-jet ink vehicle if the ratio is within the desired polarity index ratio range.

With either of the above methods, preferably, the spreading vehicle contains from 7% to 15% of a 1,2-hexanediol solvent. Additionally, the use of spreading vehicles having no added surfactant is also desired.

With the present methods, the polarity index or ratio of polar atoms to carbon atoms of the dye can be ascertained according to a simple formula, provided below. With many dyes, this calculation can provide a value between 0.3 and 1.2, for example. This value can be normalized by multiplying the ratio value by 10. In one preferred embodiment, a desired polarity index can be from about 0.7 to 1.2. Still more preferred is a desired polarity index from about 0.8 to 1.0. If normalized, the preferred values will be from 7 to 12, and the more preferred values will be from 8 to 10. Both of these figures describe the same dye properties. Normalization is merely applied to the ratio values for convenience.

To illustrate a process of assigning or ascertaining a polarity index, Formula 1 is provided below:

$$\frac{(\text{number of polar atoms}) \times 10}{(\text{number of carbon atoms})} \quad \text{Formula 1}$$

In Formula 1 above, the numbers of polar atoms that can be counted include oxygen, nitrogen, sulfur, phosphorus, and halogen atoms, e.g., chlorine, bromine, and iodine. Hydrogen is ignored in this calculation. Next, the number of carbon atoms is counted and a positive value is assigned. As mentioned, the multiplication factor of 10 is included to normalize the index to an integer value. Typically, the higher the number, the more polar the dye is, and thus, the more water soluble.

To illustrate this formula by way of example, the dye Acid Red 52 can be considered. Acid Red 52 has a chemical structure that is as follows: $C_{27}H_{28}N_2O_7S_2$. According to Formula 1, the following calculation can be carried out:

$$\frac{(2+7+2) \times 10}{27}$$

Thus, according to this simple calculation, the polarity index for Acid Red 52 is 4.1. It turns out that Acid Red 52 is a dye that, when present in a spreading vehicle, produces a significant amount of puddling on the orifice plate of an ink-jet pen. This is particularly true with ink-jet inks having spreading vehicles containing 1,2-hexanediol and in the absence of added surfactant.

After considering several dyes present in a 1,2-hexanediol spreading vehicle, it was discovered that dyes having a polarity index greater than about 7 produced ink-jet inks exhibiting no, or at least reduced, puddling on the orifice plate. More specifically, polarity index values from about 8 to 9 produced the best results. Representative dyes that have a polarity index greater than about 7 include the following: RB31, RR23, RR180, DB199, and M377.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Several ink-jet ink compositions were prepared according to the following formulation (each by weight):

| | |
|---|---|
| 2.5% | polar dye |
| 0.10% | ethylenediaminetetraacetic acid (EDTA) |
| 0.15% | 4-morpholinepropanesulfonic acid (MOPS) |
| 0.20% | PROXEL GXL |
| 9.0% | 1,2-hexanediol |
| 0.50% | neopentyl alcohol |
| balance | water |

Five different polar dyes were used to prepare five different ink-jet inks according to the above formulation. The polar dyes used in the compositions were RB31, DY132, RR23, RR180, and DB199.

Example 2

The normalized polarity index of each of the dyes used in Example 1 was calculated, and each of the ink-jet inks were jetted from a thermal ink-jet pen. After a few seconds of jetting, the orifice plate was observed under a microscope to determine the amount of puddling that had occurred. Each ink-jet ink was given a puddling score that was based upon the ink-jet ink build-up on the orifice plate during drop ejection. A subjective score from 1 to 10 was assigned to each ink-jet inks, with a score of 10 indicating extreme amounts of puddling, and a score of 1 indicating substantially no puddling. Table 1 below illustrates the results.

TABLE 1

| | RB31 | DY132 | RR23 | RR180 | AR52 | DB199 |
|---|---|---|---|---|---|---|
| Polarity Index | 8.3 | 6.3 | 8.9 | 7.2 | 4.8 | 9.4 |
| Puddling Score | 1 | 8 | 2 | 5 | 10 | 4 |

As can be seen by a review of Table 1, 1,2-hexanediol ink-jet inks without added surfactant having incorporated dyes with a polarity index greater than about 7 showed significantly less orifice plate puddling than when dyes having a lower polarity index were used. A polarity index from about 8 to 9 provided the best results.

While the invention has been described with reference to certain preferred embodiments, those skilled in the art will appreciate that various modifications, changes, omissions, and substitutions can be made without departing from the spirit of the invention. For example, though a specific vehicle is shown in the Examples, other vehicles can also be used. It is intended, therefore, that the invention be limited only by the scope of the following claims.

We claim:

1. A method of selecting a dye for use with a spreading vehicle, comprising:
    a) evaluating a first dye having polar atoms and a second dye having polar atoms to determine a first polarity index and a second polarity index, respectively, wherein the first polarity index and the second polarity index are ascertained by determining the ratio of polar atoms to carbon atoms within its respective dye; and
    b) selecting the first dye or the second dye for inclusion in the spreading vehicle based upon a comparison of the first polarity index and the second polarity index.

2. A method as in claim 1 wherein the spreading vehicle is a 1,2-hexanediol vehicle.

3. A method as in claim 1 wherein a desired polarity index range is from about 0.7 to 1.2.

4. A method as in claim 1 wherein a desired polarity index range is from about 0.8 to 1.0.

5. A method as in claim 1 wherein the ratio of polar atoms to carbon atoms within the dye is normalized by multiplying the ratio value by 10, according to the following formula:

$$\frac{(\text{number of polar atoms}) \times 10}{(\text{number of carbon atoms})}.$$

6. A method as in claim 5 wherein a desired polarity index range, when normalized, is from about 7 to 12.

7. A method as in claim 5 wherein a desired polarity index range, when normalized, is from about 8 to 10.

8. A method as in claim 1 wherein the polar atoms are oxygen, nitrogen, sulfur, and phosphorus.

9. A method of evaluating a dye and formulating an ink-jet ink, comprising:
    (a) providing a spreading ink-jet ink vehicle;
    (b) selecting a dye or mixture of dyes to be evaluated for inclusion in the spreading ink-jet ink vehicle;
    (c) determining the ratio of polar atoms to carbon atoms within the dye or mixture of dyes;
    (d) selecting a desired polarity index ratio range; and
    (e) admixing the dye or mixture of dyes with the spreading ink-jet ink vehicle if the ratio is within the desired polarity index ratio range.

10. A method as in claim 9 wherein the spreading ink-jet ink vehicle is a 1,2-hexanediol vehicle.

11. A method as in claim 9 wherein the desired polarity index ratio range is from about 0.7 to 1.2.

12. A method as in claim 9 wherein the desired polarity index ratio range is from about 0.8 to 1.0.

13. A method as in claim 9 wherein the ratio of polar atoms to carbon atoms within the dye is normalized by multiplying the ratio value by 10, according to the following formula:

$$\frac{(\text{number of polar atoms}) \times 10}{(\text{number of carbon atoms})}.$$

14. A method as in claim 13 wherein the normalized desired polarity index ratio range, when normalized, is from about 7 to 12.

15. A method as in claim 13 wherein the normalized desired polarity index ratio range is from about 8 to 10.

16. A method as in claim 9 wherein the polar atoms are oxygen, nitrogen, sulfur, and phosphorus.

17. An ink-jet ink composition exhibiting reduced orifice plate puddling, comprising:
    (a) an ink-jet ink vehicle containing 7% to 15% by weight of a 1,2-hexanediol solvent in the absence of added surfactant; and
    (b) an effective amount of a combination of at least two dyes, each dye having a normalized polarity index from about 7 to 12, wherein the normalized polarity index is calculated according to the following formula:

$$\frac{(\text{number of polar atoms}) \times 10}{(\text{number of carbon atoms})}$$

and wherein the number of polar atoms is the number of oxygen, nitrogen, sulfur, and phosphorus atoms within the dye.

18. An ink-jet ink composition as in claim 17 wherein the at least two dyes include a member selected from the group consisting of RB3, RR23, RR180, DB199, and M377.

19. A method as in claim 3 wherein during the selecting step, if one of the first dye or the second dye is within the desired polarity index range, the first dye or the second dye within the desired polarity index range is selected.

20. A method as in claim 4, wherein during the selecting step, if one of the first dye or the second dye is within the desired polarity index range, the first dye or the second dye within the desired polarity index range is selected.

21. A method as in claim 6, wherein during the selecting step, if one of the first dye or the second dye is within the desired polarity index range, the first dye or the second dye within the desired polarity index range is selected.

22. A method as in claim 7, wherein during the selecting step, if one of the first dye or the second dye is within the desired polarity index range, the first dye or the second dye within the desired polarity index range is selected.

23. A method as in claim 3, wherein during the selecting step, if the first dye and the second dye are within the desired polarity index range, then either one or both of the first dye and the second dye within the desired polarity index range is selected.

24. A method as in claim 4, wherein during the selecting step, if the first dye and the second dye are within the desired polarity index range, then either one or both of the first dye and the second dye within the desired polarity index range is selected.

25. A method as in claim 6, wherein during the selecting step, if the first dye and the second dye are within the desired polarity index range, then either one or both of the first dye and the second dye within the desired polarity index range is selected.

26. A method as in claim 7, wherein during the selecting step, if the first dye and the second dye are within the desired polarity index range, then either one or both of the first dye and the second dye within the desired polarity index range is selected.

* * * * *